FRED G. BURG,
INVENTOR.

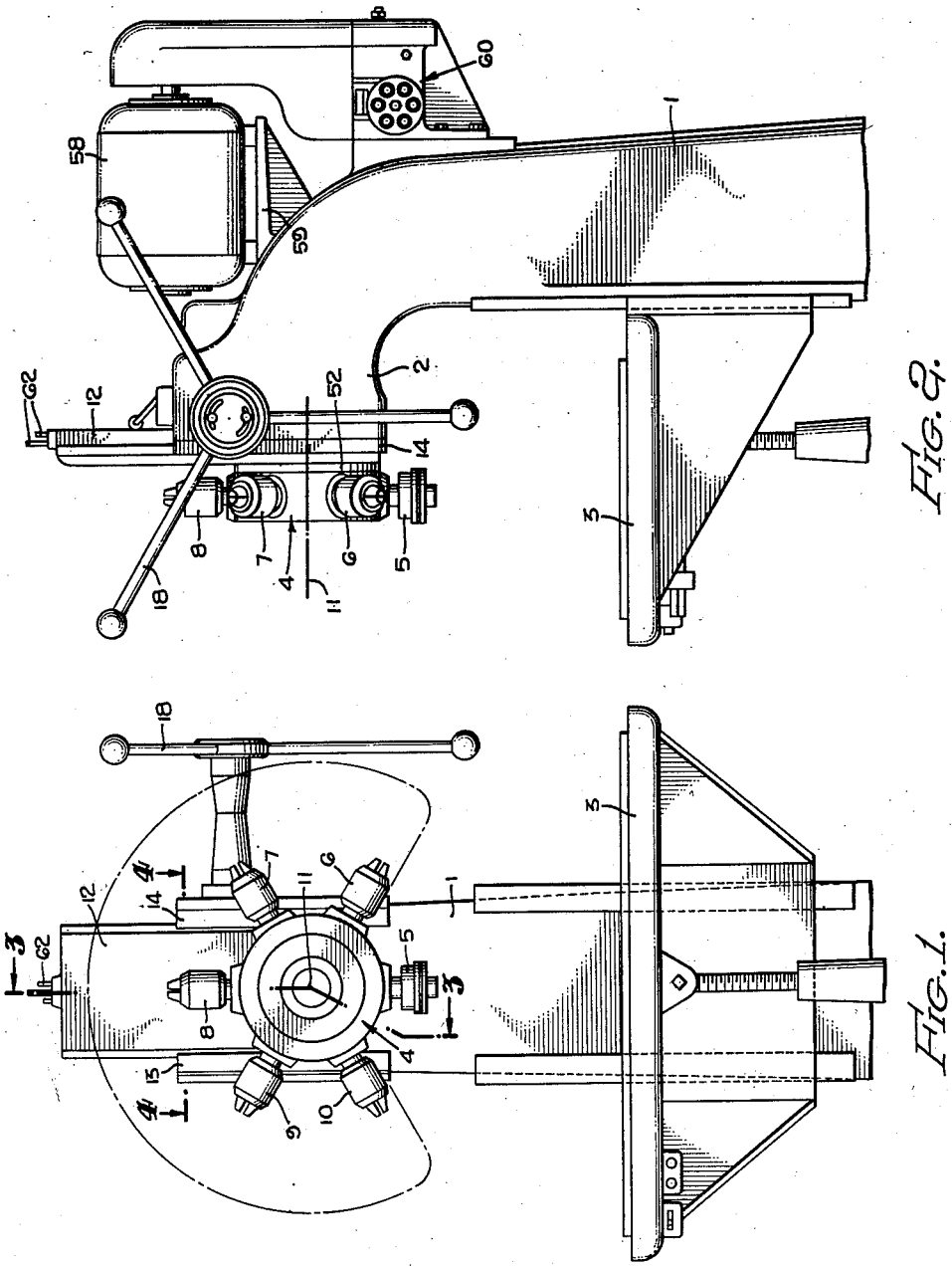
FRED G. BURG,
INVENTOR.
BY John Flam
ATTORNEY

BY John Flam

ATTORNEY

June 11, 1957  F. G. BURG  2,795,307
CYCLICALLY OPERABLE POWER TRANSMISSION MECHANISM
Filed March 14, 1952  5 Sheets-Sheet 3
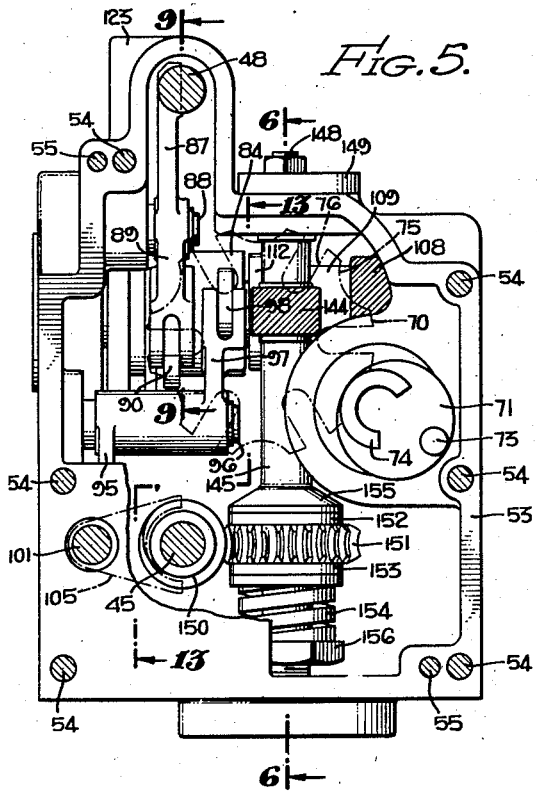
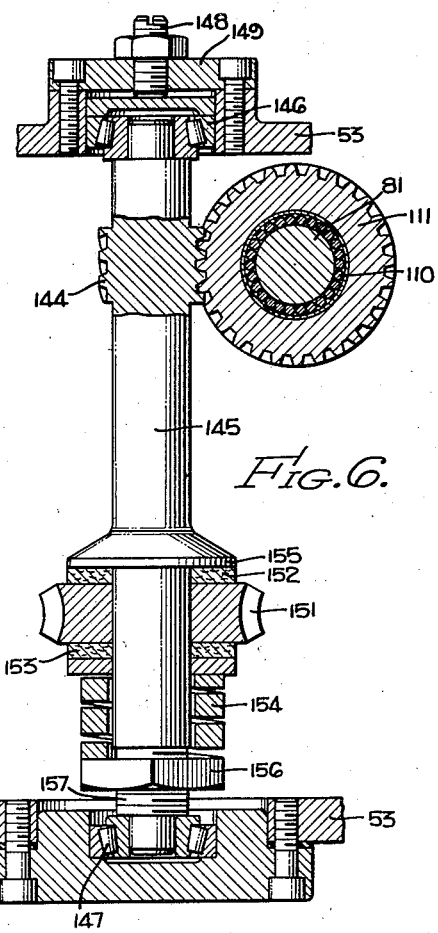
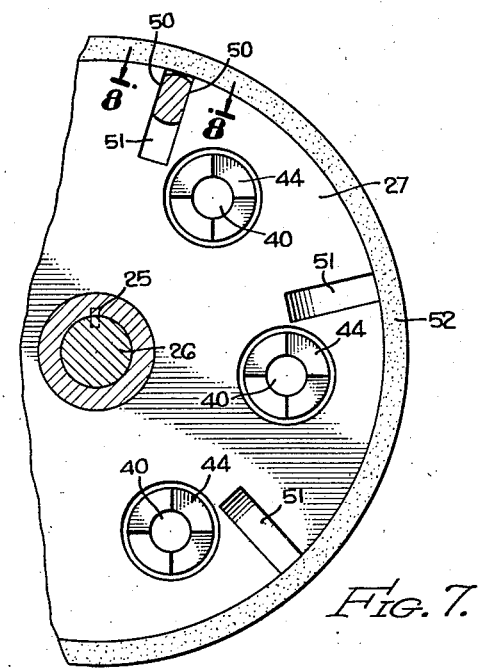
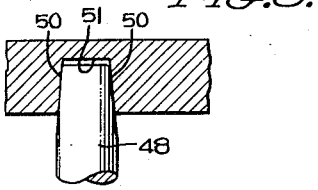
FRED G. BURG,
INVENTOR.
BY John Flam
ATTORNEY

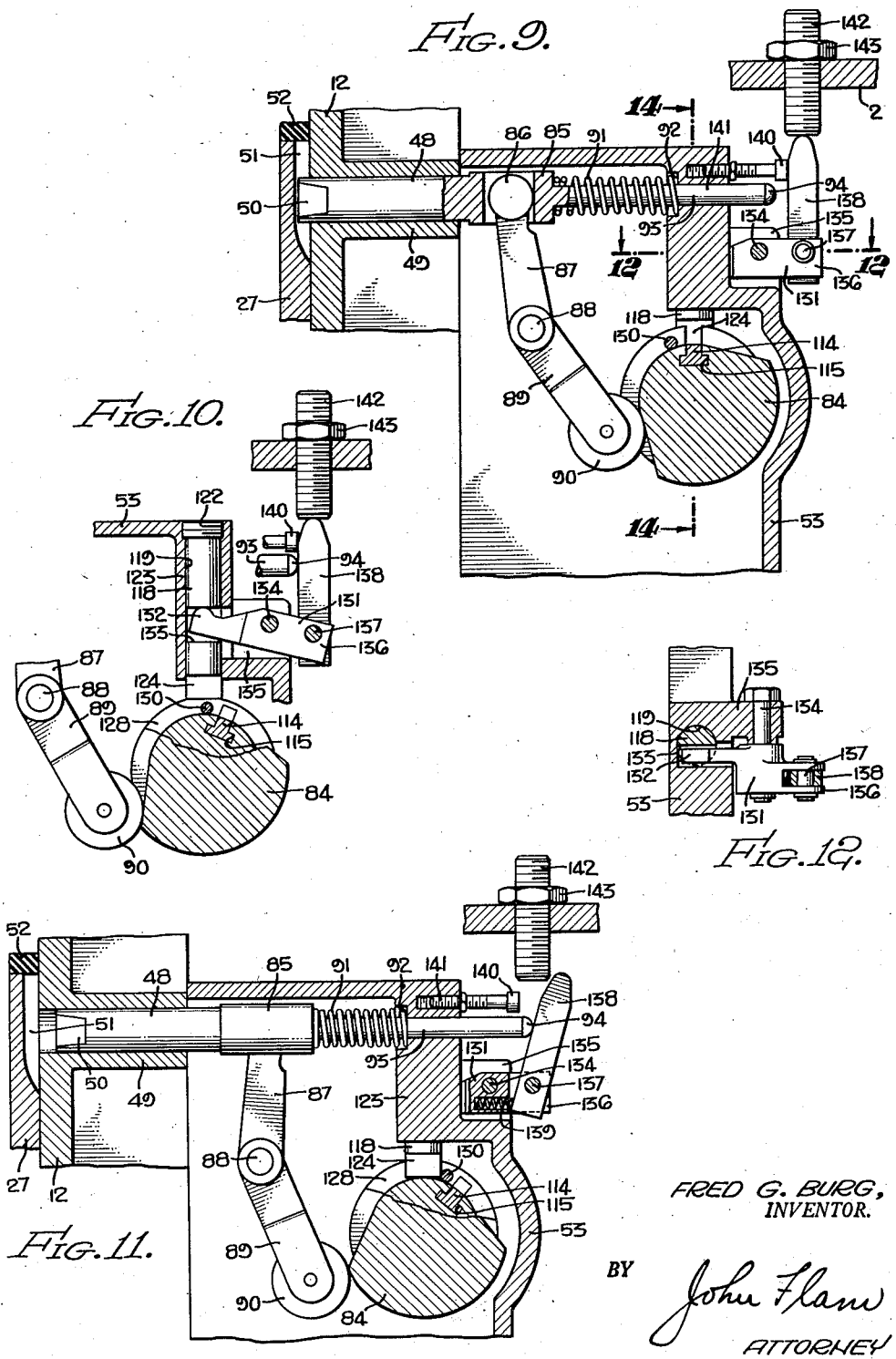

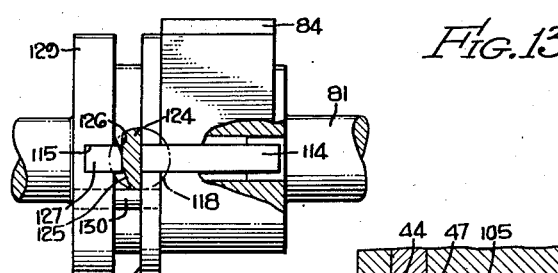

United States Patent Office 2,795,307
Patented June 11, 1957

2,795,307

CYCLICALLY OPERABLE POWER TRANSMISSION MECHANISM

Fred G. Burg, Los Angeles, Calif.

Application March 14, 1952, Serial No. 276,622

2 Claims. (Cl. 192—33)

This invention relates to a power transmission mechanism especially adapted for cyclic operation. For example, such a mechanism is useful in connection with a machine tool described and claimed in an application filed in the name of Fred G. Burg on June 10, 1948, under Serial Number 32,198, and entitled Machine Tool of the Drill Press Type Having Multiple Rotary Tools, now Patent No. 2,670,636, issued on March 2, 1954. The present application is a continuation-in-part thereof.

In said prior application, there is disclosed an angularly adjustable head, carrying rotary tool holders to operate such tools as drills, reamers, taps, etc. These tool holders are arranged on axes radial to the axis about which the head is angularly adjustable. Only one of the tool holders is rotated to cause operation of the associated tool. The head may then be moved in a direction corresponding to the axis of the active tool to perform its intended operation on the work.

After the operation, the head is moved away from the work. Upon complete retraction, a trip mechanism is operated to set in motion a power transmission mechanism of the character that is made the subject matter of this application. This power transmission mechanism then performs in proper sequence: the withdrawal of an indexing pin; uncoupling of the active tool from its source of motion; angular adjusting of the head to bring a successive tool holder into active position; returning the indexing pin to locking position; coupling the successive tool holder to the source of motion; and, if desired, to effect an adjustment of the speed of the active tool. After these functions are effected, the adjusting mechanism is returned to inactive position, and remains inactive until the head is again retracted to operate the trip mechanism.

This hereinabove recited mode of operation is described in the above identified prior application. It is one of the objects of this invention to improve, in general, the apparatus disclosed in said prior application.

The power transmission mechanism that is thus cyclically rendered active operates through a definite angle, such as a complete revolution. It is another object of this invention to improve and simplify mechanisms of this general character.

It is still another object of this invention to provide a trip device incorporated in the mechanism that is reliable and effective to initiate operation of the mechanism, and that is automatically returned to a tripping position as soon as a new cycle of machining operation is commenced.

It is still another object of this invention to ensure that, during the indexing cycle, no injury will result to the apparatus in which the transmission is utilized in the event that there be an accidental occurrence of blocking or jamming resulting in a very high resistive torque.

This invention posssses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a fragmentary front elevation of a drilling machine in which the invention is incorporated;

Fig. 2 is a fragmentary side elevation thereof;

Fig. 5 is a sectional view, taken along a plane corresponding to line 5—5 of Fig. 3;

Fig. 6 is a sectional view, taken along a plane corresponding to line 6—6 of Fig. 5;

Fig. 7 is a sectional view, taken along a plane corresponding to line 7—7 of Fig. 3;

Fig. 8 is an enlarged fragmentary sectional view, taken along a plane corresponding to line 8—8 of Fig. 7;

Fig. 9 is an enlarged fragmentary vertical sectional view, taken along a plane corresponding to line 9—9 of Fig. 5;

Fig. 10 is a fragmentary view similar to Fig. 9, but illustrating the trip mechanism just beginning its active operation;

Fig. 11 is a view, similar to Fig. 9, illustrating another step in the process of operating the trip mechanism, corresponding to a resetting action;

Fig. 12 is a fragmentary sectional view, taken along a plane corresponding to line 12—12 of Fig. 9;

Fig. 13 is a fragmentary vertical sectional view, taken along a plane corresponding to line 13—13 of Fig. 5;

Fig. 14 is a fragmentary vertical section, taken along a plane corresponding to line 14—14 of Fig. 9;

Fig. 15 is a sectional view, taken along a plane corresponding to line 15—15 of Fig. 14;

Fig. 16 is a horizontal sectional view, taken along a plane corresponding to line 16—16 of Fig. 14; and Fig. 17 is a sectional view, taken along a plane corresponding to line 17—17 of Fig. 13.

Figure 3:
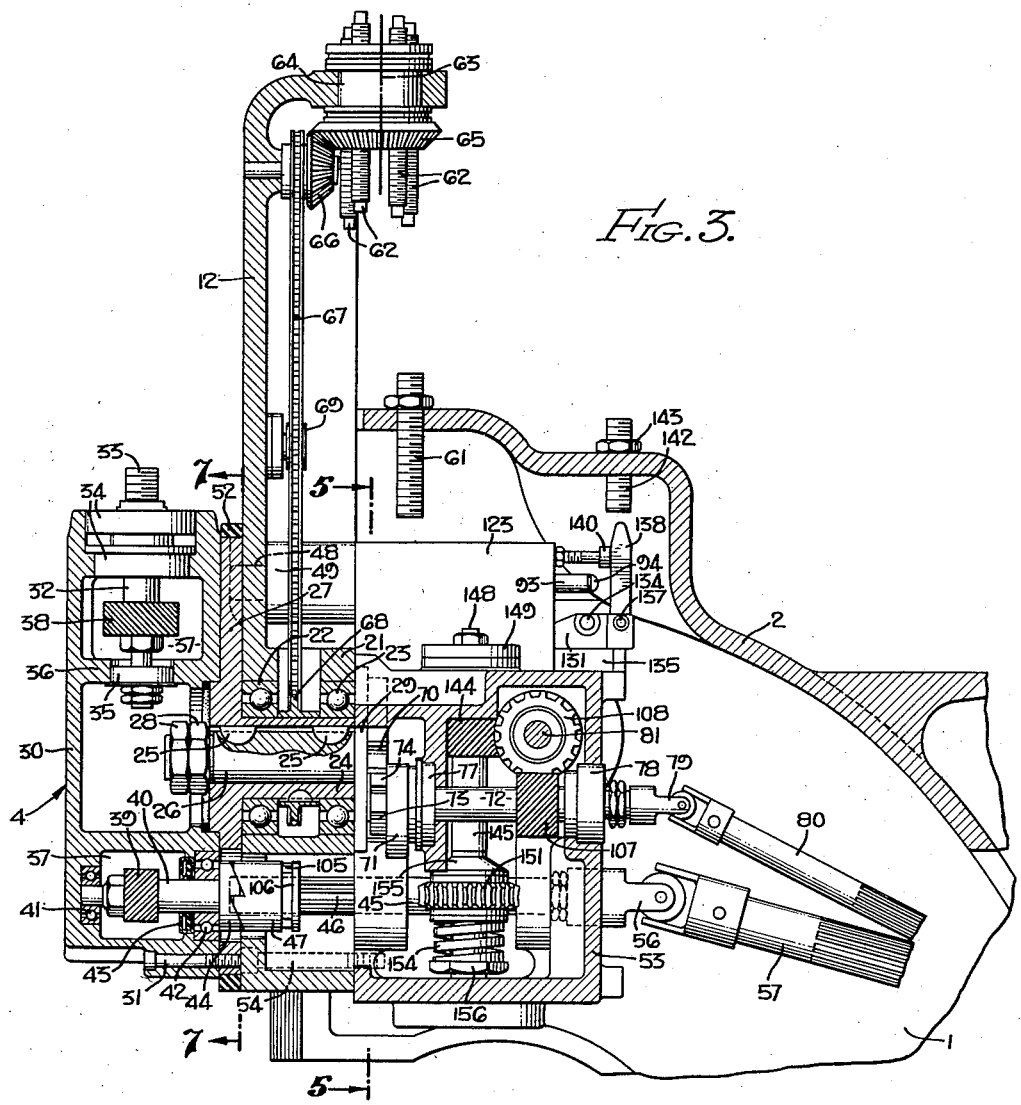
Fig. 3 is a fragmentary vertical section, on an enlarged scale, taken along a plane corresponding to line 3—3 of Fig. 1.

As shown most clearly in Figs. 1, 2, and 3, the drilling machine apparatus includes a hollow frame 1, conveniently of cast metal. It has a forwardly projecting hollow portion 2 housing the important parts of the machine.

An appropriate work-holding table 3 is arranged to be vertically adjusted with respect to the frame 1. Since this portion of the apparatus does not form any part of the invention herein described, further details of this work table are omitted.

Disposed above the work table, and supported by the frame 1, is a tool holder head 4. This tool holder head is shown as provided with a series of rotary tool holders 5, 6, 7, 8, 9, and 10. The head 4 is angularly adjusted about the horizontal axis 11. The axes of the tool holders 5 to 10, inclusive, are equiangularly spaced around the axis 11 and extend radially therefrom. The tool holder 5, for the position illustrated, is in active position to cooperate with the work on the table 3. Since six such tool holders are indicated in the present instance, the successive angular adjustments of sixty degrees effected for the head 4 about its axis of adjustment 11 will cause successive tool holders to be placed in cooperative position.

Figure 4:
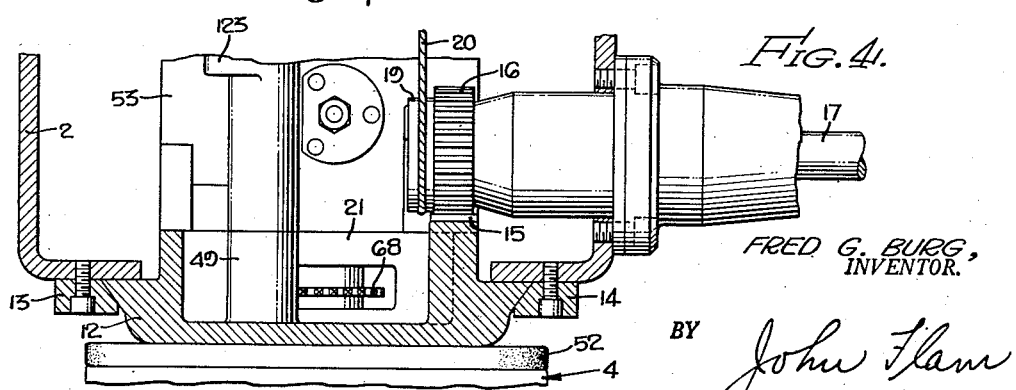
Fig. 4 is a sectional view, taken along a plane corresponding to line 4—4 of Fig. 1.

In order to move the active tool holder toward and from the work, use is made of a sliding carriage 12 (see, also, Fig. 4). This carriage 12 rotatably supports the head structure 4. It is mounted for vertical movement by the aid of the guides 13, 14 mounted on the frame extension 2. The carriage 12 (Fig. 4) is provided with a rack 15, by the aid of which the carriage 12 may be moved vertically with respect to the table 3. For this purpose, a pinion 16 is appropriately mounted upon an operating shaft 17. This shaft 17 is appropriately rotatably supported on a wall of the frame extension 2. It is adapted to be operated by a manually operable spoke wheel 18 (Figs. 1 and 2). The shaft 16 may also carry a sheave 19, or the like, over which a cable 20 is accommodated for the provision of a counterweight counterbalancing the weight of the carriage 12 and its associated structure.

The carriage 12 is provided with an inwardly directed hub 21 (Fig. 3) in which are provided the radial and thrust ball bearing structures 22 and 23. These ball bearing structures serve rotatably to support the hollow hub 24 of the head structure 4. This hollow hub is joined, as by the keys 25, to the shaft 26 that carries the head structure 4.

The head structure 4 has an end plate 27 (see, also, Fig. 7) which is integrally joined to the hollow hub 24. The left-hand extremity of shaft 26 may be threaded in order to accommodate the locking nuts 28 for holding the end wall 27 against a flange 29 mounted on the right-hand end of shaft 26. The end plate 27 is joined to the main body 30 of the head 4 by the aid of a plurality of bolts 31, one of which is shown in Fig. 3.

Each of the shafts for rotatably supporting the tool holders 5 to 10 are of the same structure. Each includes a radially arranged shaft 32 (Fig. 3) having a threaded portion 33 extending outwardly of the head 4 and threadedly connected to the appropriate tool holder. Bearing structures 34 are provided near the periphery of the head structure for the shaft 33. Another bearing structure 35 is supported on an intermediate wall 36 of the head structure. The wall 36 defines, with the exterior periphery of the head structure 4, an annular space 37. The helical driving gear 38 is mounted on the shaft 32 extending across the space 37.

Meshing with the helical gear 38 is helical gear 39 mounted on a shaft 40. Such a shaft is also illustrated in Fig. 13. All of the shafts 40 are appropriately rotatably supported, as by the ball bearing structures 41 and 42. An oil seal 43 may also be disposed around the shaft 40 adjacent its right-hand end.

Each of the shafts 40 is provided with a coupling member 44 (see, also, Figs. 7 and 13).

Only the active tool holder is rotated by a power shaft 45 shown in Fig. 3. This power shaft has, at its left-hand end, a splined portion 46 (Figs. 3 and 13) upon which is slidable a cooperating coupling member 47. This coupling member 47 may be moved toward the right, as viewed in Figs. 3 and 13, along the splines 46 in order to disconnect the driving shaft 45 from the active tool holder. After the head structure 4 has been angularly adjusted to a new position, the coupling member 47 may be moved toward the left to reconnect a new tool holder driving shaft 40 for active operation. The manner in which this is accomplished will be described hereinafter.

In order to index and lock the head structure 4 in its adjusted position, use is made of a locking pin 48 (Figs. 3, 5, 7, 8, and 9). This locking pin 48 has a general cylindrical configuration, and is mounted in a guide boss 49 of the carriage 12. Its extremity is formed by plane converging surfaces 50, illustrated most clearly in Fig. 8. These converging surfaces are adapted to engage corresponding converging walls of one of a series of recesses 51 in the rear surface of the plate 27. There are as many equiangularly spaced recesses as there are tool-holders.

Accordingly, in order to adjust the head structure 4 about the axis 11, the indexing pin must be moved toward the right to free the head 4, as viewed in Fig. 9, to the position shown in Fig. 11. The mechanism whereby this is accomplished will be hereinafter described.

A resilient sealing ring 52 (Figs. 3, 9, and 11) is disposed around the periphery of the plate 27 in order to cover the ends of the recesses 51.

The power shaft 45, as shown most clearly in Fig. 3, is appropriately journaled by the aid of the walls of a gear casing 53 (Fig. 5) which is attached to the rear face of the carriage 12. A plurality of cap screws 54 are provided, as well as one or more dowel pins 55, to mount the gear casing accurately on carriage 12. Power shaft 45 is driven through a universal joint structure 56 (Fig. 3) and a drive shaft 57 that is connected through a power transmission to the driving electric motor 58 (Fig. 2).

By the provision of the universal joint structure 56, the upward and downward movement of the carriage 12 is permitted without interfering with the transmission of motion from the source of power.

This motor 58 is mounted on a bracket 59 appropriately mounted on the rear shoulder of the frame 1. A belt and pulley transmission is provided between the motor 58 and a mechanism for adjusting the speed of the drive of shaft 57. This mechanism, indicated generally by the reference character 60 in Fig. 2, is described and claimed in an application filed March 15, 1952, in the name of Fred G. Burg of Los Angeles, California, under Serial Number 276,755 and entitled Cyclically Operable Power Transmission Mechanism, now Patent No. 2,767,598. The downward travel of the carriage 12 with the head 4 may be definitely limited for every adjusted position of the head. One form of device for accomplishing this purpose is described in said prior application, Ser. No. 32,198.

In Fig. 3, the limiting of the downward movement is accomplished by the aid of any one of six screws 62. These screws are arranged annularly about an axis 63 of an angularly adjustable, rotatable support 64. One of the screws 62 is arranged, when the carriage 12 is moved downwardly, to contact the upper surface of an elevated stop integrally formed on the upper wall of hollow portion 2 of frame 1.

In order to position the screws 62 in succession directly above the stop, use is made of a bevel gear drive including the bevel gears 65 and 66. Bevel gear 65 is attached to the rotatable angularly adjustable member 64. The bevel gear 66 is adapted to be driven by a chain 67 engaging a sprocket wheel 68 (see, also, Fig. 4). A tightening or idler pulley 69 may be provided to keep the sprocket chain mechanism in proper operative position.

As the head 4 is angularly adjusted, the sprocket wheel 68, through the chain 67 and gears 66 and 65, serves to position a cooperating screw 62 above stop screw 61.

A Geneva movement is provided for adjusting the head 4 about its axis 11. This Geneva movement is indicated in phantom lines in Fig. 5, and is also indicated in Fig. 3.

Thus, upon the flange 29, integrally attached to shaft 26, is mounted a Geneva wheel 70. Cooperating with this Geneva wheel is a crank mechanism or disc 71 mounted on a shaft 72. This crank mechanism includes a driving pin 73, as well as an arcuate member 74 adapted to engage any one of concave surfaces 75 on the periphery of the wheel 70. The pin 73 is adapted to engage any one of the slots 76.

Accordingly, one revolution of the shaft 72 will cause operation of the Geneva wheel 70 through one-sixth of a revolution, and there is a corresponding angular movement of the head 4.

The shaft 72 is rotatably supported by the aid of bearing structures 77 and 78 (Fig. 3) mounted in appropriate walls of the gear box 53.

As indicated in Fig. 3, shaft 72 is connected, as by universal joint 79, to a shaft 80 which operates in conjunction with mechanism 60 for adjusting the speed of the driving shaft 45 for every angular adjustment of the head 4. This mode of adjustment, as heretofore stated, is described and claimed in said prior application, Ser. No. 276,755.

The complete cycle of adjusting operation includes operation of the indexing pin 48 to release the head 4 to permit it to be angularly adjusted and, at the conclusion of the cycle, relocking it in a succeeding recess 51. The cycle of adjustment also includes shifting of coupling 47 (Fig. 13) to disengaging position and to return this coupling to engaging position at the conclusion of the adjusting operation. Lastly, the adjusting operation includes the rotation of the Geneva movement shaft 72 through a complete revolution, this adjustment occurring while the pin 48 is retracted and coupling 47 is disengaged.

For effecting these operations in proper cyclical order, a shaft 81 (Figs. 3, 14, and 16) is provided, and which is rotated through one revolution whenever the adjustments are required. This shaft 81 is appropriately mounted in the bearing structure 82 at its left-hand end, and an appropriate bearing 83 at its right-hand end. These bearing structures are mounted in the walls of the gear casing 53.

The left-hand extremity of the shaft 81 carries an integrally formed cam 84, shown in this instance as integral with the shaft 81. This cam 84 serves to operate two bell crank levers, respectively for operating the index pin 48 and for operating a shift fork structure for moving the coupling 47 to disengaging position.

The operation of the indexing pin 48 may be best described in connection with Figs. 9, 10, 11, and 12.

Pin 48 is provided with an enlarged intermediate cylindrical portion 85. This portion of the pin 48 is cut away for the accommodation of the upper end 86 of the bell crank lever 87. This bell crank lever, as shown most clearly in Fig. 5, is appropriately mounted on a pin 88 supported upon a wall of the gear casing 53. The lower arm 89 of the lever 87 is bifurcated for the accommodation of a cam follower roller 90. This roller is adapted to be contacted by the periphery of the cam 84. As the shaft 81 rotates in a clockwise direction, as viewed in Figs. 9 10, and 11, lever 87 is rocked in a clockwise direction. This occurs shortly after the shaft 81 is operated. Fig. 10 illustrates the position of the mechanism near the beginning of motion of shaft 81. The pin 48 is completely withdrawn in the position of Fig. 11. In this position, a compression spring 91 has been compressed between the enlarged portion 85 of pin 48 and the bottom of a recess 92 formed in a wall of gear casing 53. Accordingly, the head 4 is now unlocked to permit it to be adjusted angularly about its axis 11.

The pin 48 carries an extension 93 of smaller diameter slidably accommodated in the wall of casing 53, and has a rounded end 94. The function of this rounded end 94 will be explained hereinafter.

Upon completion of one revolution of the shaft 81, the parts resume the position of Fig. 9. The head structure is thus locked in its new position.

A revolution of the shaft 81 also operates the coupling member 47 through a cycle. For this purpose, another crank lever 95 (Figs. 5 and 13) is provided. This crank 95 is pivotally mounted on a pin 96 supported on a wall of the casing 53. The upper arm 97 of the lever 95 is bifurcated for the accommodation of a cam follower roller 98 also operated by the cam 84.

The lower end 99 of the lever 95 is accommodated in a slot 100 of a shift rod 101 (see, also, Figs. 5 and 17). This rod 101 is slidably mounted in a wall of the casing 53, and has a reduced extension 102 also mounted in a wall of the casing 53. The compression spring 103 serves to urge the shift rod 101 toward the left, as viewed in Fig. 13. A sealing O-ring 104 may be provided around the rod 101 in order to prevent flow of any lubricating filling in the casing 53 toward the left into the head structure.

The shift rod 101, as indicated in Figs. 5 and 17, is parallel to the power shaft 45, and carries a shift fork 105. This shift fork 105 engages in an annular groove 106 in coupling member 47 and its consequent return under the influence of spring 103.

The cam 84 is so arranged that the retraction of the indexing pin 48 and of the coupling member 47 (Figs. 9 and 13) is effected before the pin 73 (Fig. 5) of the Geneva movement engages a slot 76. Accordingly, the head 4 may be angularly adjusted by this Geneva movement. Furthermore, the angular adjustment of head 4 is completed before the indexing pin 48 and the coupling member 47 are returned to their active positions.

The crank disc 71, as shown most clearly in Fig. 3, is rotated by the aid of a helical gear 107 (see, also, Fig. 14). This helical gear 107 is driven from the shaft 81 by the aid of the helical gear 108 mounted on a reduced portion of shaft 81. This gear is keyed to shaft 81 and held against the shoulder 160 of the shaft by a spring retainer ring 161.

Shaft 81 is arranged to be given a single revolution at a time whenever the head 4 and its carriage 12 are moved upwardly away from the work to an upper limiting position.

For this purpose, a hollow shaft 109 surrounds the shaft 81 and is continuously rotated in a manner to be hereinafter described. However, it is not coupled to the shaft 81 until it is desired to do so by the operator moving the head 4 and its carriage 12 upwardly to a limiting position away from the work. Shaft 109 may be appropriately rotatably supported with respect to the shaft 81, as by a needle bearing structure 110.

For driving the shaft 109 continuously, a helical gear 111 is mounted at its left-hand end (Figs. 6, 14, and 15). On the left-hand face of this gear 111 is integrally formed a slotted disc 112. In the present instance, four slots or recesses 113, equiangularly spaced, are provided in the face of this disc. It serves as one clutching element. The other clutching element includes a slidable key 114 (Figs. 14 and 16). This key is carried in a slot 115 (see, also, Figs. 9 and 10) so as to be movable in a direction parallel to the axis of shaft 81. As shown most clearly in Figs. 9 and 10, the slot 115 is T-shaped, and the key 114 is correspondingly formed in order to restrain the key 114 from movement radially outwardly of the slot.

The key 114 is adapted to cooperate with any one of the slots 113, thereby coupling the shaft 81 to the shaft 109. The key 114 is constantly urged toward engaging position by a compression spring 116 (Fig. 14) which is accommodated in a recess 117 in the key 114.

In the position shown in Figs. 14 and 15, the key 114 is restrained against clutching engagement with any of the recesses 113 by a restraint or dog 118 (Figs. 10, 11, and 14). This dog is in the form of a pin guided radially with respect to shaft 81 by an appropriate cylindrical bore 119 formed in the boss 123 of gear casing 53. It is urged radially inwardly by a compression spring 120 (Fig. 14) engaging in a recess 121 formed in the upper end of the dog 118. A headless screw 122 covers the recess 119 at its upper end, and also serves as an abutment for the spring 120.

The lower projection 124 of the dog 118 has a sloping surface 125 (Fig. 16) which cooperates with a corresponding sloping surface 126 formed on the enlarged head portion 127 of the key 114 (Fig. 14). In the restraining position of the dog 118, the projection 124 is accommodated in an annular groove 128 formed on the enlarged left-hand portion of the shaft 81. In the restraining position of Figs. 14 and 16, the sloping surface 125 is slightly in advance of the sloping surface 126.

When the dog 118 is moved upwardly in a manner to be hereinafter described (Fig. 10), the key 114 is freed, and it is urged toward the right by the spring 117 to move into one of the recesses or slots 113 that pass the right-hand end of the key 114 as the constantly driven shaft 109 rotates. Thereafter, the dog 118 is permitted to be urged downwardly into the groove or recess 128; and, as the shaft 81 moves in the direction of the arrow 129, the two sloping surfaces 125 and 126 engage, causing retraction of the key 114 to the left. This occurs after one revolution of the shaft 81. Accordingly, the clutching mechanism is disengaged and returns to the position of Fig. 16.

In order to prevent overrunning of the shaft 81, a transverse pin 130 (Figs. 9, 10, and 16), extending across the annular recess 128, abuts the projection 124 and provides a positive stop for limiting rotation of shaft 81 to one revolution.

Movement of the dog 118 to releasing position is effected by the aid of a lever 131 having an operating portion 132 (Figs. 10, 12 and 14). This operating portion 132 is accommodated in a slot 133 formed in the dog 118. The lever 131 is pivoted on a pin 134 mounted on a projection 135 of the gear casing 53 (see, also, Fig. 11).

The right-hand end of lever 131 carries a bifurcation 136 across which extends a pivot pin 137. This pivot pin 137 carries an operating member 138 (Figs. 3, 9, 10, 11, and 12). This operating member is urged to the upright position shown in Figs. 3, 9, and 10 by the aid of a compression spring 139 located in recesses in the lever 131. This compression spring 139 urges the operator 138 into contact with a stationary stop 140. This stop 140 is formed as a head on a screw 141 which is threaded into an aperture in the casing 53.

As the carriage 12 moves upwardly, carrying with it the gear casing 53, the upper end of this operating member 138 is brought into contact with a stationary abutment screw 142 (Figs. 3, 9, 10, and 11). This stationary abutment screw is held in adjusted position by a nut 143, and is mounted in a threaded aperture in the projection 2 of the main frame 1.

A slight further upward movement of carriage 12 and casing 52 causes the lever 131 to swing in a clockwise direction to the position of Fig. 10. In this position, the dog 118 has moved out of the path of the key 114, which is then free to engage one of the recesses or slots 113. This position is indicated in Fig. 10. In order to limit the upward movement of carriage 12 to a position corresponding to Fig. 10, a stop screw 61 (Fig. 3) is provided. This screw is adjustably mounted in the top wall of projection 12. Its lower end is adapted to be contacted by the top wall of boss 123. In this way, excess pressure cannot be applied to the trip assembly including operator 138.

Shortly after the shaft 81 begins its revolution, the operating member 138 is moved out of contact with the stop screw 142. This is accomplished by the rod 93, connected to the indexing pin 48. This rod 93 is moved toward the right by the cam 84 (Fig. 11) at the same time as the pin 48 is moved to disengaging position. Accordingly, the compression spring 120 (Fig. 14) is now free to move the dog 118 radially inwardly in a position to limit the movement of shaft 81 to one revolution. At the end of the revolution, the rod 93 is retracted, and the operator 138 is free to move to the active position of Fig. 9 just as soon as the carriage 12 moves downwardly.

By this means, therefore, the cyclic operations of the indexing pin 48 of the coupling member 47 and of the Geneva cam disc 71 are effected.

The constantly driven gear member 111, mounted on the hollow driving shaft 109, is driven by a mechanism illustrated most clearly in Figs. 3, 5, and 6. Thus, the gear 111 may be driven by a helical gear 144 integrally formed on a driving shaft 145. This driving shaft 145 is appropriately supported by a roller bearing structure 146 at its upper end and a corresponding roller bearing structure 147 at its lower end. These roller bearing structures are appropriately attached to the top and bottom walls of the gear casing 53. A set screw 148 extends through the cover plate 149 for the bearing structure, and bears against the upper surface of the bearing structure 146 in order to maintain the bearing structure in proper relation.

The shaft 145 is continuously rotated by the power shaft 45 by the aid of a worm 150 engaging worm wheel 151 carried by the shaft 145. This worm wheel 151 is coupled to the shaft 145 by the aid of friction discs 152 and 153 engaging opposite sides of the wheel 151.

The friction discs 152 and 153 are made of any suitable friction material, such as brake lining material. A frictional force is imposed between these discs 152 and 153, against the opposite faces of wheel 151, by the aid of a heavy compression spring 154. This compression spring urges the discs 152 and the wheel 151 toward the face of a flange 155 formed on the shaft 145. This spring 154 encompasses shaft 145, and is held in place by a nut 156 threaded on the terminal extremity of the shaft 145.

By the provision of this friction clutching arrangement, any accidental jamming of the adjusting mechanism will yet permit the gear 151 to move, although the shaft 145 is stalled. In this way, the friction clutch structure forms a safety device ensuring against undue stresses in any part of the adjusting mechanism actuated by the shaft 81.

The inventor claims:

1. In a device of the character described: a driving shaft; a clutch mechanism having one element driven by the driving shaft, and a driven element; means for coupling said elements; said means being movable in a direction parallel to and spaced from the axis of the clutch mechanism; means urging said coupling means toward coupling position; a restraint for holding the said coupling means out of coupling relation; said restraint being movable toward and from the axis of the clutch mechanism; a lever engaging the restraint to move said restraint out of the path of said coupling means; a pivoted operating member carried by the lever; means for engaging said operating member to move the lever; resilient means for urging the operating member to a position aligned with said means for engaging said operating member; and means for moving said operating member out of alignment upon initiation of motion of the driven clutch element for returning the restraint to restraining position, said restraint and the coupling means having cooperating surfaces to move the coupling means to uncoupling position upon completion of a revolution of the driven clutch member.

2. In combination: a shaft; a continuously rotating member on the shaft; a clutch part connected to the member and rotating therewith; a cooperating clutch part mounted on the shaft and movable in a direction to engage and disengage the other clutch part; means for causing the clutch parts to engage to move the shaft through a limited angle, and then to disengage the clutch parts; said means including a force-transmitting link having an alternative position in which it is out of the path of the operating force, as well as resilient means for returning said link to force-transmitting position; a movable element operated through the clutch parts; a locking pin operated by the shaft to lock and unlock said movable element; and means carried by the pin for moving the link to ineffective position when the locking pin is operated by the shaft to unlocking position.

References Cited in the file of this patent

UNITED STATES PATENTS

| 489,279 | White | Jan. 3, 1893 |
|---|---|---|
| 712,644 | Blackhall | Nov. 4, 1902 |
| 1,027,262 | Levey | May 21, 1912 |
| 1,508,827 | Valiquet | Sept. 16, 1924 |
| 1,853,766 | Hahnemann | Apr. 12, 1932 |
| 1,981,167 | Frost | Nov. 20, 1934 |
| 2,004,794 | Munschauer | June 11, 1935 |
| 2,506,452 | Havir | May 2, 1950 |

FOREIGN PATENTS

| 245,069 | Germany | Mar. 26, 1912 |